(No Model.) 4 Sheets—Sheet 1.
G. D. BURTON.
ELECTRICAL CONVERTER.

No. 475,184. Patented May 17, 1892.

WITNESSES

INVENTOR
George D. Burton
By F. C. Somes,
Attorney (No Model.)  4 Sheets—Sheet 2.

G. D. BURTON.
ELECTRICAL CONVERTER.

No. 475,184. Patented May 17, 1892.

WITNESSES.

INVENTOR:
George D. Burton,
By F. C. Somes,
Attorney (No Model.) 4 Sheets—Sheet 3.

G. D. BURTON.
ELECTRICAL CONVERTER.

No. 475,184. Patented May 17, 1892.

WITNESSES:
INVENTOR
George D. Burton
By F. C. Somes
Attorney (No Model.) 4 Sheets—Sheet 4.

G. D. BURTON.
ELECTRICAL CONVERTER.

No. 475,184. Patented May 17, 1892.

WITNESSES:

INVENTOR:
George D. Burton
By F. C. Somes
Attorney

UNITED STATES PATENT OFFICE.

GEORGE D. BURTON, OF BOSTON, MASSACHUSETTS, ASSIGNOR TO THE ELECTRICAL FORGING COMPANY, OF MAINE.

ELECTRICAL CONVERTER.

SPECIFICATION forming part of Letters Patent No. 475,184, dated May 17, 1892.

Application filed October 21, 1891. Serial No. 409,390. (No model.)

*To all whom it may concern:*

Be it known that I, GEORGE D. BURTON, of Boston, in the county of Suffolk and State of Massachusetts, have invented a new and useful Improvement in Mechanism for Converting Electrical Currents and Methods of Applying the Same, of which the following is a specification.

My invention relates to that class of mechanism known as "converters" for converting electrical currents from one potential to another and for applying the current from them to the heating of metals, whether such heating be for the purpose of forging, welding, or soldering; and it consists in certain new and useful constructions and combinations of the several parts of the mechanism and in the method of applying the electrical current therefrom to the work to be performed, substantially as hereinafter described and claimed.

Figure 1:
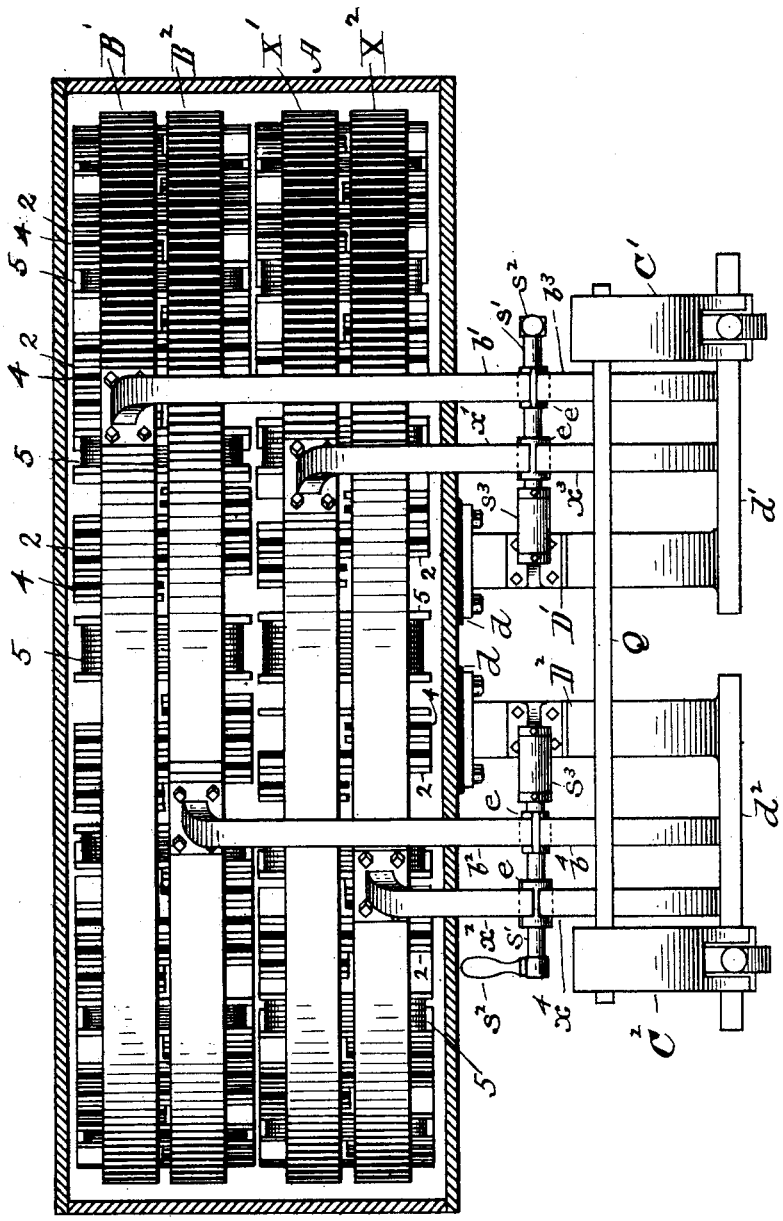
Figure 2:
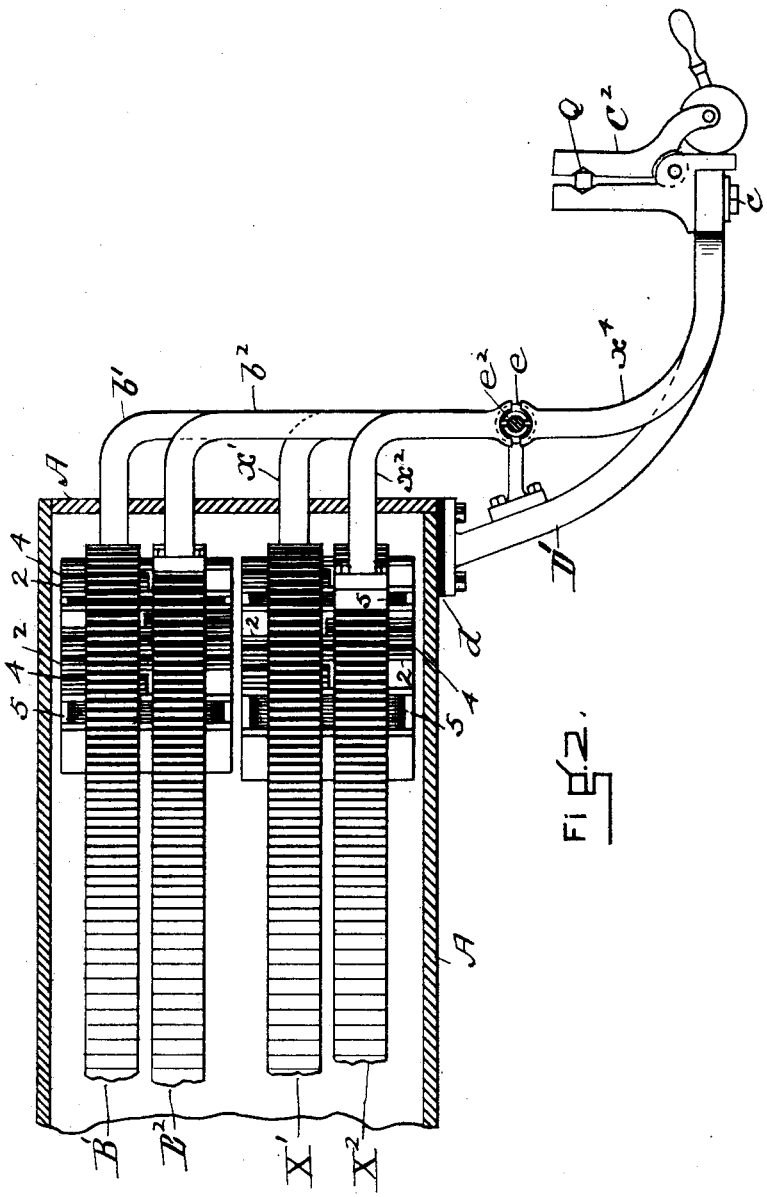
Figure 3:
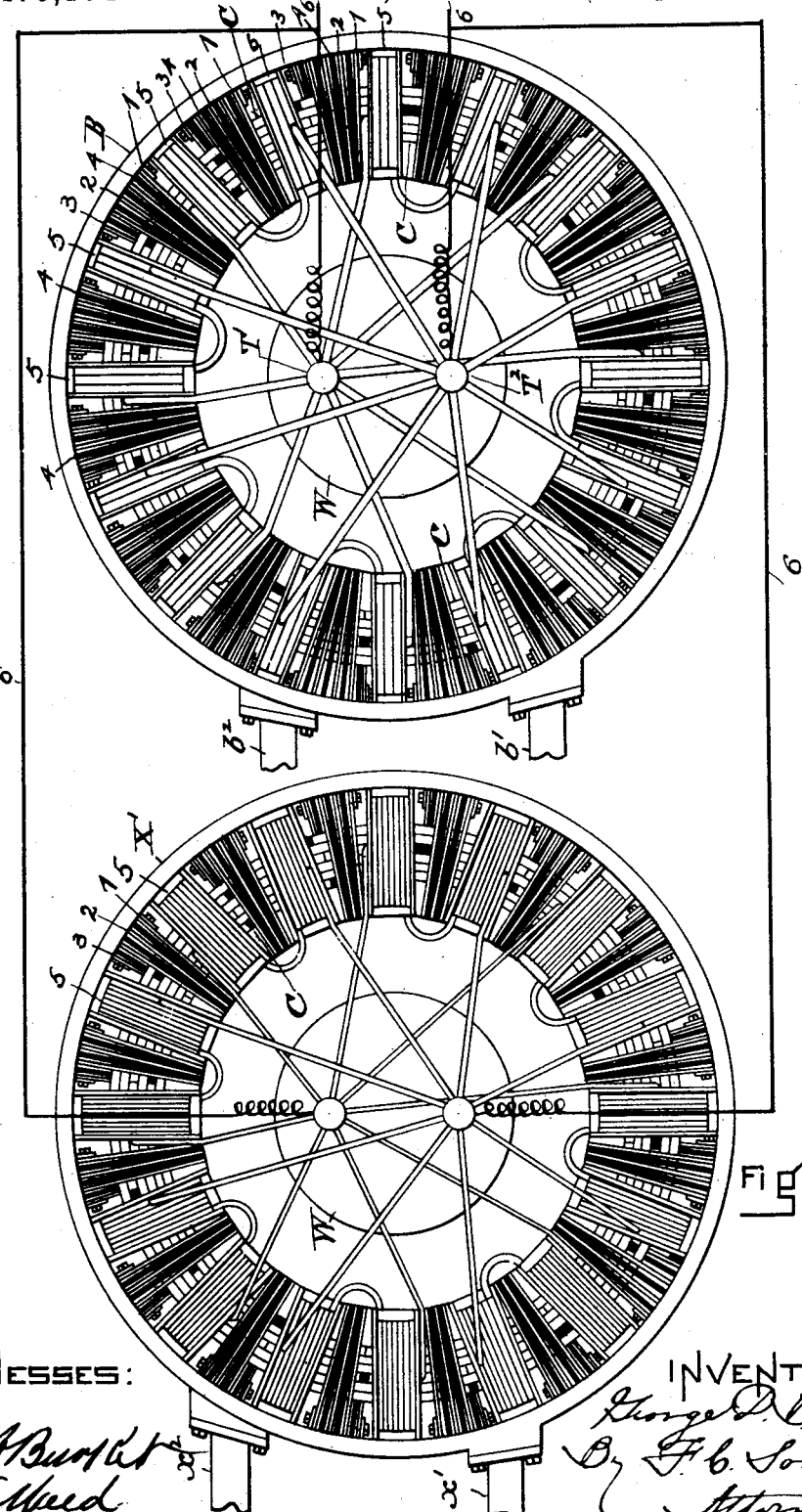
Figure 5:
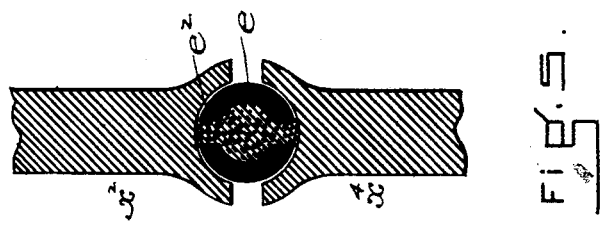
Figure 4:
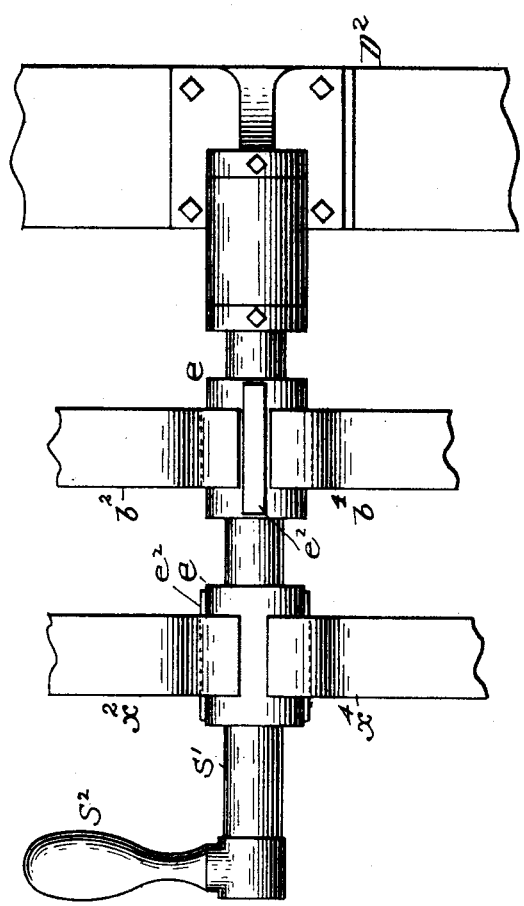

In the drawings, Figure 1 represents a front elevation of my improved converter with the outer casing shown in section to more clearly exhibit the internal construction. Fig. 2 is a side elevation of a portion of Fig. 1. Fig. 3 shows the two parts of the converter separated from each other and the casing removed and exhibited in top plan view, so as to clearly show the method in which they are constructed and connected to the source of primary-current supply. Figs. 4 and 5 are detail views of the switch or cut-out which is used for regulating the application of the secondary current of the converter to the work to be done.

A is the outer casing of the converter, which may be made of wood, sheet metal, or any other suitable material. Within this casing is located my compound converter, which consists of two single converters combined together, substantially as hereinafter described. The upper single converter is composed of the outer conducting-rings $B'$ $B^2$. To the ring $B'$ are attached the positive terminals 1 1 of the secondary coils 2 2, while the negative terminals 3 3 of the same coils are attached to the conducting-ring $B^2$. These attachments are made by bolting the ends of the copper plates of which these coils are composed to ears on the inside periphery of the rings, as is shown in the plan, Fig. 3. It will be observed that each secondary coil consists in this case of three complete turns of the copper strip or plate around the core C. The intervening pieces 4 4, which are placed between the turns of the secondary coil to separate them from each other, are of insulating material, such as vulcanite.

The core C of the converter consists of lengths of soft-iron telegraph-wire laid upon each other in the form of a circle, with breaks between their ends and without the lengths of wire being insulated from each other. The insulation 4 4 is, however, so arranged as to prevent the core from touching the secondary coils. The secondary coils are attached in parallel to the conducting-rings $B'$ $B^2$.

Between the secondary coils the primary coils 5 5 are placed upon the core, being wound upon wooden or vulcanite spools, through the hole in the center of which the core passes. These spools insulate the turns of the primary coils from the conducting-rings $B'$ $B^2$, from the secondary coils, and from the converter. Each pair of these spools is connected in series, and its positive and negative terminals are also connected to the positive and negative terminal points $T'$ $T^2$, which receive the corresponding terminals of the electric circuit 6, which is in turn connected to the source of the primary current. It will of course be understood that the primary-circuit wires of the converter are insulated by being wound with suitable material. The terminals $T'$ $T^2$ of the primary circuit are supported upon the wooden base W in the center of the converter.

The primary coils 5 5 in the converter consist of comparatively fine wire and a large number of turns upon the spools, while the secondary coils consist of large copper sheets or plates bent edgewise with comparatively few turns around the core.

The other single converter, which goes to make up the compound one, is formed of a pair of conveying-rings $X'$ $X^2$, corresponding to $B'$ $B^2$, just described, and each of its secondary coils has its terminals attached in parallel to these rings, the only difference in construction being that each secondary coil makes but two turns around the core C, instead of three complete turns, as in the first converter. The primary coils 5 5 are also made of fine wire, with more turns on their spools than the primary coils of the first converter, as is clearly shown in Fig. 3. The effect of this construction is that the single converter last described converts the primary current into a secondary current of lower potential than the first converter above described. The object of this invention is to use these two currents in a compound converter in varying proportions, or alternately or successively in the heating of metals.

It is well known that in the heating of metals by the electric current—such as iron, steel, or brass—the resistance of the bar increases quite rapidly as it becomes heated up to about 400°. It therefore requires a higher potential in the heating-current to force it through the bar after it becomes thus heated than when it begins to be heated by the current. When a single converter is used, the degree of reduction of the potential of the heating-current has to be arranged with relation to this property of the bar to increase its resistance as the heating progresses. The reduction of the potential is, therefore, with the single converter not so low as to provide for the most economical heating of the bar in the outset and is somewhat lower than is desirable for the most economical heating of the bar after it has reached the temperature of 400°. In other words, to meet the requirements of the heating the current is a wasteful one and in the case of some metals much more so than with others. I propose to avoid these difficulties by employing a compound converter consisting of two single converters, which reduce the primary currents to secondary currents of different potential, and so arrange and connect these two converters that their secondary currents may be applied to the heating or maintaining the heat of the same bar at different stages in the heating process. For this purpose I employ the following-described mechanism:

Depending from the positive and negative conducting-rings $B'$ $B^2$ of the upper converter are the arms $b'$ $b^2$, and depending from the conducting-rings $X'$ $X^2$ of the lower converter are the arms $x'$ $x^2$. These arms are composed of copper or other suitable highly-conductive material and are attached to the rings by means of bolts, or in any other suitable manner, so as to form a good contact, and hence they constitute detachable electric conductors. The lower ends of these arms are in line with each other and are turned out cylindrically, so as to form the upper half of a bearing, in which a shaft may be turned. Brackets $D'$ $D^2$ are bolted to the under side of the casing of the converter, being properly insulated therefrom by the insulating-strips $d$. These brackets carry on their lower ends the stands $d'$ $d^2$, and on these stands are mounted the clamps $C'$ $C^2$, which are bolted to the stands by the bolts and nuts $c$, Fig. 2, and in these the bar Q to be heated is held. It must be understood that these clamps and stands are of copper or other suitable material, which will conduct the electricity with sufficient ease to prevent heating.

From the stand $d'$ extend upward the arms $b^3$ $x^3$, which have their upper ends in line with the downwardly-projecting arms $x'$ $b'$, and their upper ends are rounded out to form the other part of the bearing, in which the shaft $s'$ is made to turn. The outer end of this shaft is provided with the handle $s^2$ for revolving it, and the inner end is journaled in the box $s^3$.

Between the cupped-out ends of the arms on the shaft the bosses or cylinders $e$ $e$ revolve. These bosses are almost in contact with the arms and have extending through them the copper blocks $e^2$, which are made of such dimensions that when the shaft $s'$ is turned in one direction to the proper point it can be made to rest in the spaces between the arms $b'$ $b^3$, for example, without touching them; but the copper block $e^2$, which comes between the arms $x'$ $x^3$, is set at a different angle on the shaft $s'$ from the one which comes between the arms $b'$ $b^3$, so that the shaft $s'$ may be turned to the position which will throw the arms $b'$ $b^3$ partly or entirely out of connection with each other, while the arms $x'$ $x^3$ remain in connection with each other, or vice versa. Another pair of arms $b^4$ $x^4$ rise from the stand $d^2$, so as to correspond with the arms $b^2$ and $x^2$ in the manner just described for the stand $d'$, and a shaft $s'$, with bosses $e$ $e$, bearing $s^3$, and handle $s^2$, is provided to connect and disconnect the arms $x^2$ and $x^4$ and the arms $b^2$ and $b^4$.

In operating the compound converter the current from the lower rings $X'$ $X^2$ is first turned onto the bar Q and begins to heat it with a current of very small potential and very heavy. When the heating process has continued until the resistance of the bar requires a current of higher potential to force it through the bar economically, the shafts $s'$ are turned by means of the handles $s^2$ and the lower converter is thrown out of action instantaneously and the current of the upper converter thrown onto the bar, which, being of a higher electrical tension, completes the heating in the most economical manner. By turning the shafts $s'$ slowly to the proper point a portion of one current and a portion of the other current from the two converters may be used conjointly, which is of considerable advantage in some cases.

What I claim as new and of my invention is—

1. The combination, in an apparatus for electric heating, of metal-holders arranged to hold the metal to be heated, with two converters arranged to furnish electric currents of different potential, and intervening connecting mechanism arranged to connect and disconnect either of said converters from the metal-holders at the will of the operator, substantially as described.

2. The method of heating metal by the electric currents, which consists in commencing the heating process with a current of lower potential and when the resistance of the metal is increased by the heat in employing a current of higher potential to complete the heating process, substantially as described.

3. The combination of two converters, divided arms or conductors $x^2$ $x^4$ and $b^2$ $b^4$ and $b'$ $b^3$ and $x'$ $x^3$, respectively, having movable conducting-blocks of metal interposed between their parts, and metal-holders arranged to hold the metal to be heated by the electric currents flowing through them from said converters, substantially as described.

4. The combination of two converters, divided arms or conductors $x^2$ $x^4$ and $b^2$ $b^4$ and $b'$ $b^3$ and $x'$ $x^3$, connected thereto and respectively having rotating conducting-blocks of metal interposed between their parts, and metal-holders arranged to hold the metal to be heated and connected to said conductors, substantially as described.

5. The combination of the metal-holder $C'$, the two converters, the divided conductors $b'$ $b^3$ and $x'$ $x^3$, connecting the metal-holder with the converters, and the shaft $s'$, carrying metal blocks arranged to partially or wholly disconnect the parts of one conductor when it connects the parts of the other one, substantially as described.

6. In an electric-current converter, the combination of positive and negative rings arranged on the exterior of the converter and connected to the secondary circuit of the converter and detachable electric conductors composed of bars of metal, and metal-holding devices adjustable on said conductors.

7. An electric converter for converting electric currents by induction from a higher to a lower potential, provided with two continuous rings of different polarity disposed on the outside of the converter and connected with opposite terminals of the secondary coils thereof.

8. In an electric metal-heating apparatus, a combination of a converter for converting electric currents from a higher to a lower potential, provided with rings of opposite polarity connected to opposite terminals of the secondary coils and disposed on the exterior of the converter, and metal-holders connected with said rings for holding the metal to be heated.

GEO. D. BURTON.

Witnesses:
CHESTER MARR,
R. W. GALLUPE.